United States Patent
Genova et al.

(10) Patent No.: US 7,587,543 B2
(45) Date of Patent: Sep. 8, 2009

(54) APPARATUS, METHOD AND COMPUTER PROGRAM PRODUCT FOR DYNAMIC ARBITRATION CONTROL

(75) Inventors: Daniele Di Genova, Hopewell Junction, NY (US); Tin-Chee Lo, Fishkill, NY (US); Yuk-Ming Ng, Poughkeepsie, NY (US); Jeffrey M. Turner, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 11/338,209

(22) Filed: Jan. 23, 2006

(65) Prior Publication Data

US 2007/0174530 A1   Jul. 26, 2007

(51) Int. Cl.
G06F 12/00 (2006.01)
G06F 13/14 (2006.01)
G06F 13/38 (2006.01)
G06F 13/00 (2006.01)
G06F 11/00 (2006.01)

(52) U.S. Cl. ............... 710/241; 710/200; 710/240; 710/317; 714/39

(58) Field of Classification Search .......... 710/110, 710/113, 116, 118, 200, 240–241, 244, 316–317, 710/114; 714/39
See application file for complete search history.

(56) References Cited

U.S. PATENT DOCUMENTS

| 5,682,485 | A | * | 10/1997 | Farmer et al. ............ 710/316 |
| 6,038,651 | A | * | 3/2000 | VanHuben et al. ........ 712/21 |
| 6,671,275 | B1 | * | 12/2003 | Wong et al. ............. 370/389 |
| 7,219,178 | B2 | * | 5/2007 | Harris et al. ............ 710/110 |
| 2002/0159389 | A1 | * | 10/2002 | Foster et al. ............ 370/230 |
| 2004/0019733 | A1 | * | 1/2004 | Garinger et al. .......... 710/314 |

OTHER PUBLICATIONS

Brauss, Stephan et al. "An Efficient Communication ARchitecture for Commodity Supercomputers". SC '99, Portland, OR. 1999. ACM. 1-58133-081-8/99/0011. pp. 1-17.*

* cited by examiner

Primary Examiner—Thomas J Cleary
(74) Attorney, Agent, or Firm—Cantor Colburn LLP; Arthur Ortega

(57) ABSTRACT

A dynamic arbitration controller includes components for reading current state information as well as records of known arbitration states which may cause a deadlock condition, comparing the current state to the records of known arbitration states and resolving deadlock conditions during arbitration. The dynamic arbitration controller may include circuits for storing and retrieving information related to the arbitration. The dynamic arbitration controller may be implemented as a circuit design or as a computer program product stored on machine readable media.

16 Claims, 6 Drawing Sheets ically pointed out and distinctly claimed in the claims at
APPARATUS, METHOD AND COMPUTER PROGRAM PRODUCT FOR DYNAMIC ARBITRATION CONTROL

BACKGROUND OF THE INVENTION

The present disclosure relates generally to semiconductor design, and more specifically to controlling and resolving deadlock conditions.

As the complexity of integrated circuits continues to grow, certain implementations have introduced new problems that must be overcome. Consider for example, implementation of single chip designs, (referred to as "system-on-a-chip"). In system-on-a-chip designs, which typically use cross point switches for managing internal communications, the number of interfaces has grown. Accordingly, the number and complexity of potential and actual communication conflicts have grown as well.

Existing techniques for arbitration by the cross point switches typically result in deadlock situations (or conditions) because of the complexity. Therefore, what is needed a technique for resolving deadlock situations within a single chip.

BRIEF SUMMARY OF THE INVENTION

An apparatus for resolving a deadlock situation in a circuit having at least one cross point switch as a communications arbiter, is disclosed, wherein the apparatus includes: a dynamic arbitration controller for reading at least one record having information regarding known arbitration states for causing the deadlock situation, a comparator for comparing a current arbitration state of the at least one cross point switch to the at least one record, and a resolver for resolving the deadlock situation by using the information.

Also disclosed is a method for resolving a deadlock situation in a circuit having at least one cross point switch as a communications arbiter, the method including: reading a current arbitration state of the at least one cross point switch using a dynamic arbitration controller and, reading at least one record having information regarding known arbitration states for causing the deadlock situation; comparing the current arbitration state of the at least one cross point switch to the arbitration state of the at least one record; and, resolving the deadlock situation.

Further disclosed is a computer program product stored on machine readable media and for resolving a deadlock situation in a circuit having at least one cross point switch as a communications arbiter, the product including instructions for: reading a current arbitration state of the at least one cross point switch using a dynamic arbitration controller and, reading at least one record containing information regarding known arbitration states for causing the deadlock situation; comparing the current arbitration state of the at least one cross point switch to the arbitration state of the at least one record; and, resolving the deadlock situation.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

In typical embodiments, a dynamic arbitration control provides for recognition and resolution of deadlock conditions in a distributed cross point switch. The dynamic arbitration controller monitors the current state of arbitration and compares the current state to at least one record of conditions that may cause the deadlock condition. Typically, the at least one record is maintained in deadlock registers that are programmable registers. Also typically, the at least one record includes information regarding specific characteristics for a given deadlock condition. If the dynamic arbitration controller finds a match, it will take actions to alleviate the deadlock. Preferably, upon detection of the deadlock, the dynamic arbitration controller saves the current state of arbitration. Saving the current state provides for orderly resolution and permits arbitration to resume from the point it was interrupted. Accordingly, a deadlock free distributed cross point switch can be implemented in the system-on-a-chip environment. Using this technique avoids, among other things, the cost of logic replication.

In order to place the teachings herein into context, it is important to have a basic understanding of the problem to be solved. FIGS. 1-5 provide graphic depictions of communication protocols and problems within a cross point switch. It should be noted that examples provided herein are greatly simplified and only indicative of aspects of communication issues that may arise during operation of the cross point switch. Accordingly, the examples provided herein merely illustrate certain aspects and capabilities of the dynamic arbitration controller, and therefore not limiting of the invention.

Figure 1:
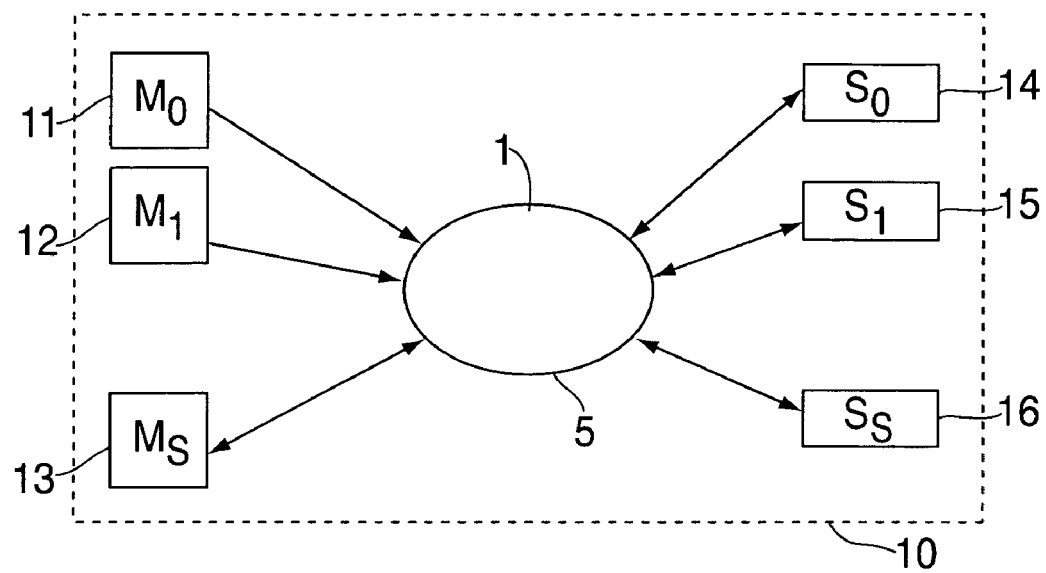
FIG. 1 is a block diagram depicting a prior art cross point switch with an arbiter.

Referring to FIG. 1, a prior art design for arbitration is shown. In FIG. 1, a typical cross point switch 10 includes an arbiter 5. In this example, the arbiter 5 manages a bus 1. The bus 1 provides communication pathways between various resources. In this example, the bus 1 provides for communications between resources including an arbiter 5 and a first master 11, a second master 12 and at least another master 13. The bus 1 also provides for communications between the arbiter 5 and a first slave 14, a second slave 15 and at least another slave 16. It should be recognized that this example is illustrative and not limiting of design for a cross point switch 10. For example, the bus 1 of the cross point switch 10 may include access to any number of resources (i.e., more the three masters and slaves depicted herein). Further, the bus 1 may be subdivided into separate components where a first bus and a second bus are managed by the arbiter 5 or a similar device.

Figure 2:
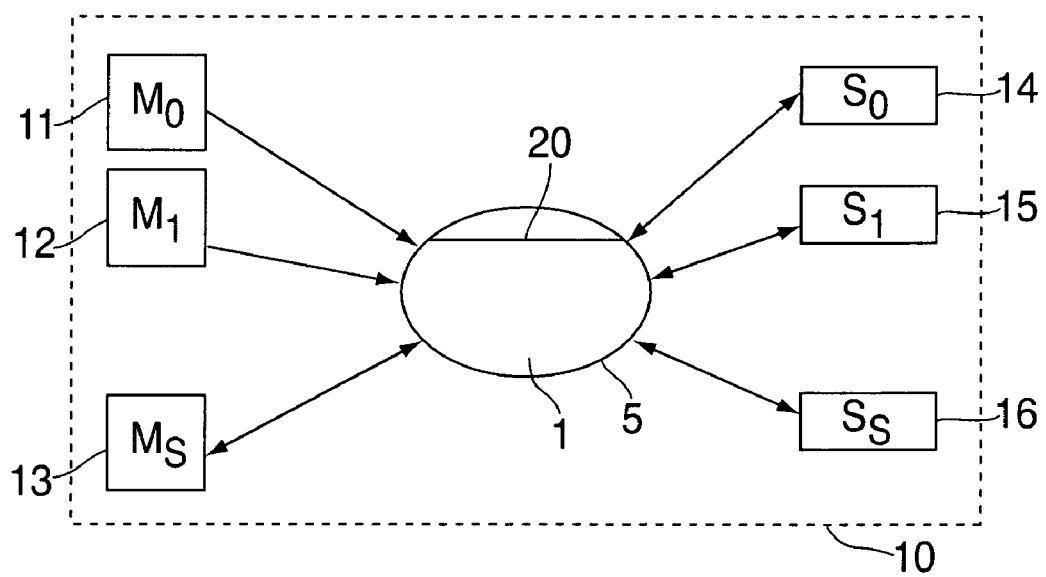
FIG. 2 is a block diagram depicting a master granted bus tenure to a slave.

Referring now to FIG. 2, a first request 20 is shown. This request was submitted by the first master 11 for access to the first slave 14. The first request 20 is submitted through the bus 1 to the arbiter 5. Granting the first request 20 requires access to and priority (also referred to herein as "tenure") on the bus 1. Since there are no other outstanding requests, the first master 11 is granted tenure on the bus 1 without complication. Typically, first master 11 will maintain tenure on the bus 1 until such time as the first master 11 receives an acknowledgement from the first slave 14. Note that master level resources are logically linked with the slave level resources, in particular, for this example the first slave 14.

Figure 3:
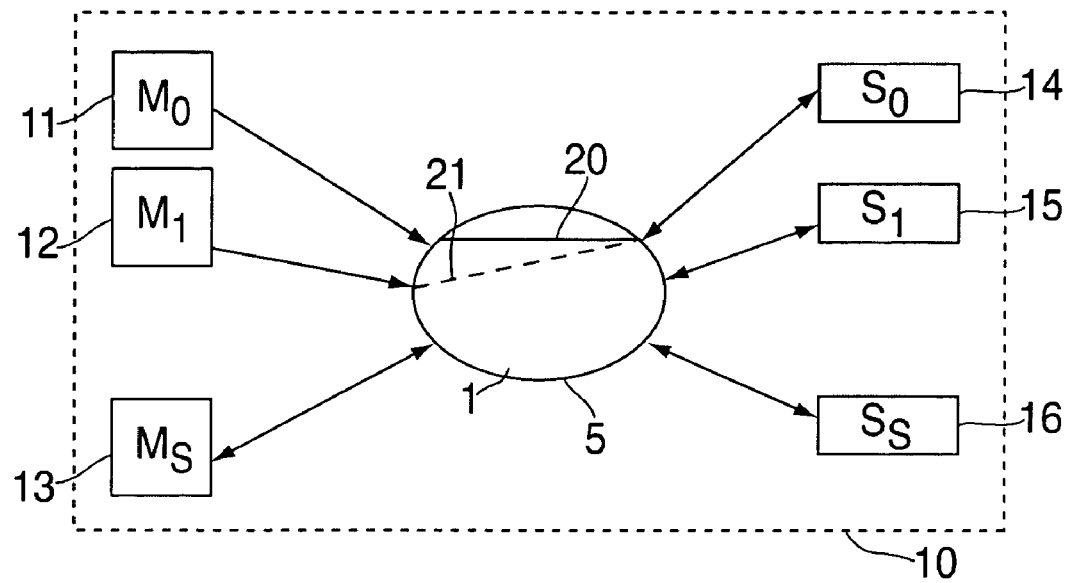
FIG. 3 is a block diagram depicting a second master making the request for the slave.

Continuing with this example, and in reference to FIG. 3, shortly after the first master 11 is granted tenure on the bus 1, the second master 12 submits a secondary request 21 for interaction with the first slave 14. Since the first master 11 has tenure on the bus 1, and there are no other requests outstanding, the second master 12 is scheduled for tenure on the bus 1 after the first master 11 concludes interaction with the first slave 14. Aspects of this relationship are depicted in FIG. 3, wherein the another master 13 asserts a tertiary request 22 (depicted in FIG. 4 and FIG. 5), which is awaiting completion of the first request 20.

Figure 4:
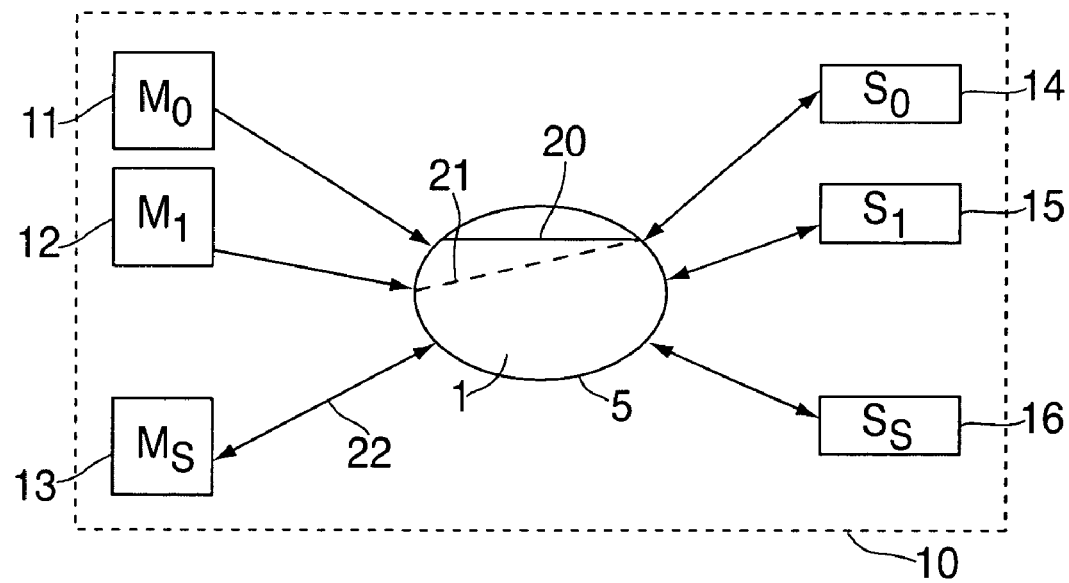
FIG. 4 is a block diagram depicting a deadlock situation resulting from the request the second master.

Referring to FIG. 4, in this example, while the first slave 14 is processing data from the first master 11, the tertiary request 22 that is submitted by the another master 13 goes unsatisfied. In order for the first slave 14 to process the tertiary request 22 from the another master 13, the another master 13 requires data from the second slave 15. It is the requirement for data causes the another master 13 to submit the tertiary request 22 the second slave 15. However, since the first master 11 has tenure on the bus 1 and the second master 12 is next in line, the second master 12 will not receive tenure on the bus 1. This typically results in the deadlock situation.

Figure 5:
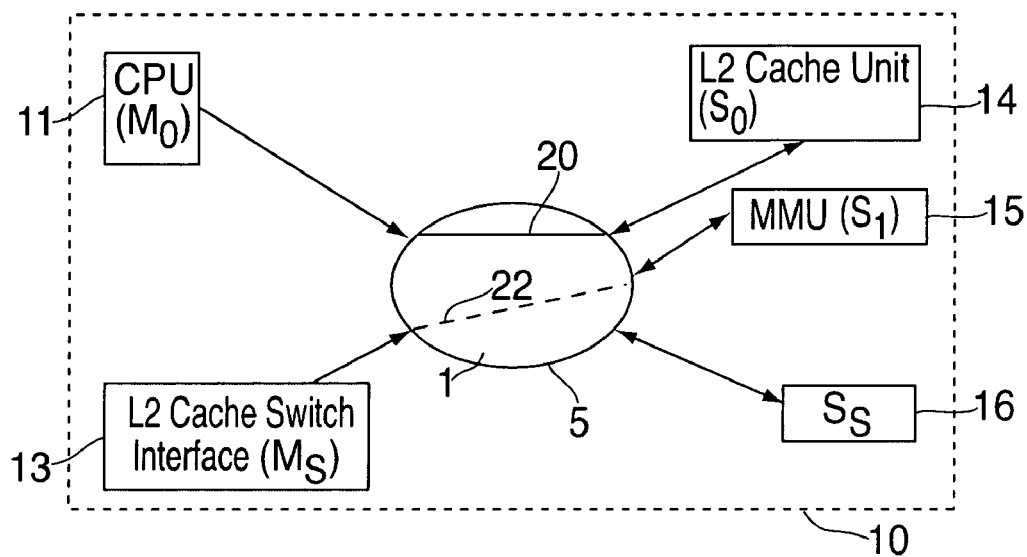
FIG. 5 is a block diagram depicting an example of a deadlock situation after a cache miss.

Referring now to FIG. 5, a more specific example of the foregoing deadlock situation is depicted. In FIG. 5, a CPU ($M_0$) is the first master 11. An L2 Cache Unit ($S_0$) is the first slave 14. The L2 Cache Switch Interface (used to resolve misses) is the another master 13. An MMU ($S_1$) is the second slave 15. In this example, the first master 11 (the CPU) is accessing the first slave (the L2 cache switch ($S_0$)) via the first request 20, a cache access. The result of the accessing is a cache miss. In order for the cache access by the CPU to be completed, the L2 cache switch must receive data from the second slave 15 (the MMU ($S_1$)), via the second request 22. However, the only way for the L2 Cache Unit ($S_0$) to receive data from the MMU is for the cross point switch 10 to grant tenure on the bus 1 to the L2 Cache Switch Interface ($M_s$). Since the CPU ($M_0$) already has tenure on the bus 1 and is waiting for data form that L2 Cache Unit ($S_0$), the L2 Cache Switch Interface ($M_s$) will never be granted tenure on the bus 1. The deadlock situation arises because of the data interdependence.

The deadlock situation may also be referred to anywhere herein as a "deadlock condition," as a "system conflict," as a "resource conflict," or simply as a "conflict."

There are a number of techniques that may be used to mitigate the frequency of deadlock situation occurrences. Various examples include as assigning priority levels and committing to round-robin scheduling tenure on the bus 1. However, experience has shown the deadlock situation will arise regardless.

The dynamic arbitration controller as disclosed herein provides for the recognition deadlock situation and the resolution thereof. Typically, the dynamic arbitration controller references the current state of arbitration and compares the current state against a set of "deadlock registers." Exemplary deadlock registers include programmable DCR registers that contain arbitration states that will result in a deadlock situation. If the dynamic arbitration controller finds a match between the current state of arbitration and a content of a deadlock register, dynamic arbitration controller will take actions to alleviate the deadlock situation. One example of actions that may be taken is described below. Incorporation of the dynamic arbitration controller provides for use of a cross point switch in the system on a chip environment while avoiding problems associated with the deadlock situation.

Figure 6:
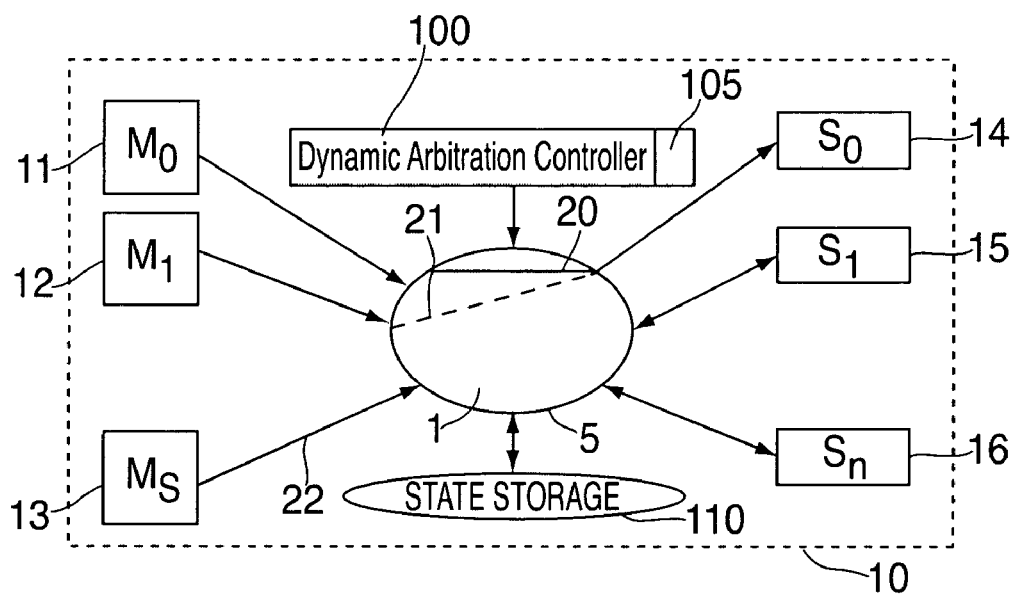
FIG. 6 is a block diagram depicting aspects of management the deadlock situation by a dynamic arbitration controller.

FIG. 6 depicts aspects of the same example given above with reference to FIGS. 1 through 5. The dynamic arbitration controller 100 solves the problem of the deadlock situation by identifying interdependencies, such as those described above. The dynamic arbitration controller 100 does this by checking the current arbitration state in the arbiter against a record of known arbitration states 105 that will cause the deadlock situation to occur.

Identification of arbitration states that may cause the deadlock situation is completed through the use of known techniques. In non-limiting examples, various chip design or other simulators are employed. By use of such techniques, the record of known arbitration states 105 may be assembled. Programming the record of known arbitration states 105 is likewise completed using known techniques.

Typically, the record of known arbitration states 105 includes a plurality of records. Each one of the records includes information for characterizing each of the potential deadlock situations. Typically included within each record is information including instructions for resolving the deadlock situation. The included information may include a procedure for managing unique or common aspects of arbitration for the various deadlock situations.

In the example depicted in FIG. 6, the dynamic arbitration controller 100 detects a deadlock condition. Upon detection of the deadlock condition, the dynamic arbitration controller 100 saves the current state of arbitration into a state storage 110. The dynamic arbitration controller 100 provides for arbitration to resume from the point where the arbitration was interrupted. The deadlock condition is alleviated by temporarily masking the first request 20 from the first master 11 and the second request 21 from the second master 12. By doing so, outstanding requests may then be addressed. Accordingly, another master 13 is granted tenure on the bus 1 for fulfillment of the third request 22. Once fulfillment of the third request 22 has occurred, the arbiter 5 may then resume fulfillment of the first request 20 and a second request 21.

Figure 7:
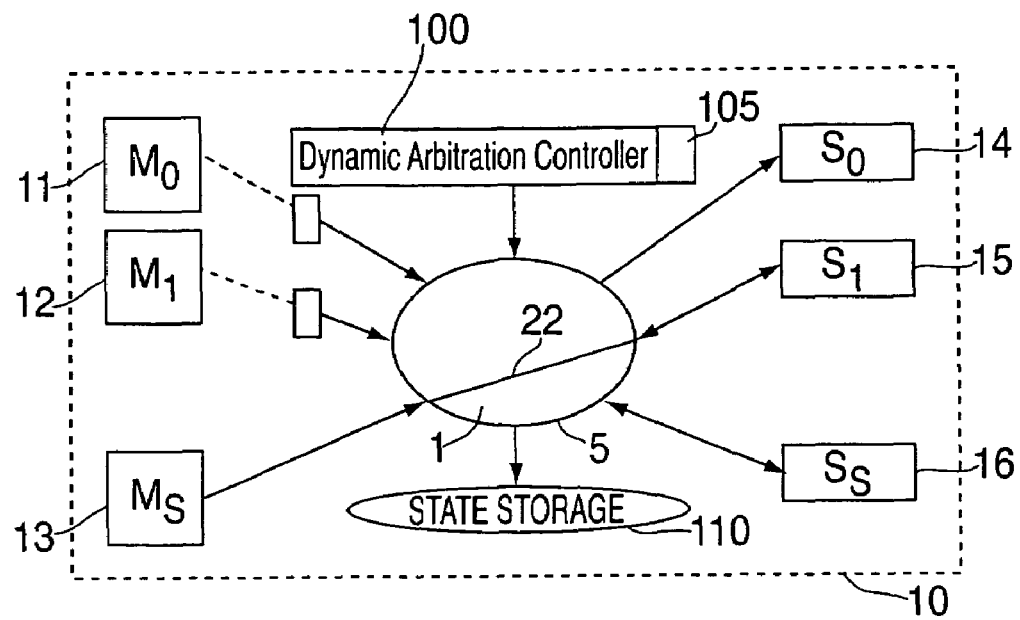
FIG. 7 is a block diagram depicting management of the arbitration state by the dynamic arbitration controller.
Figure 8:
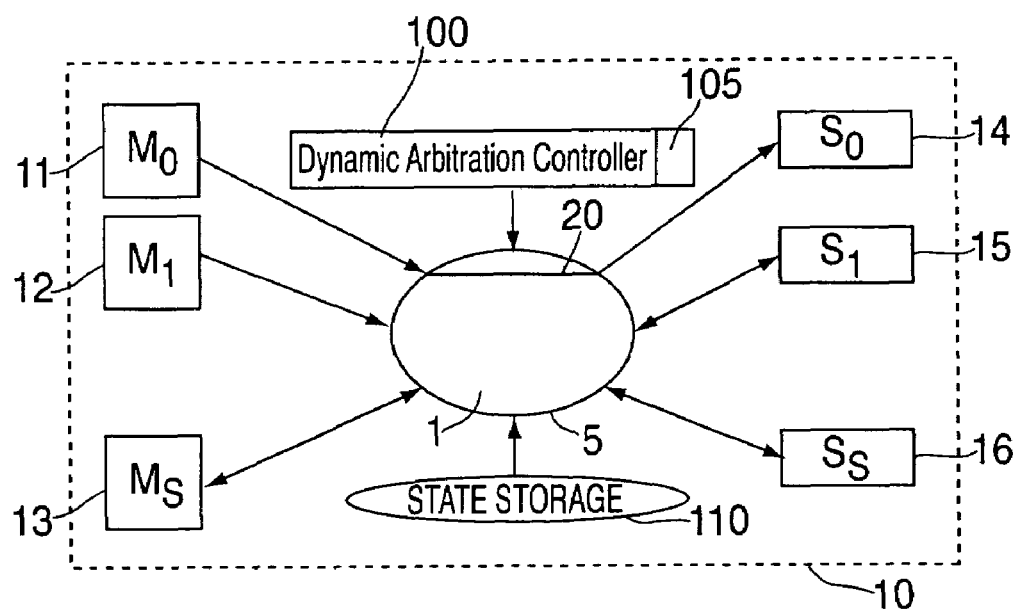
FIG. 8 is a block diagram depicting restoration of the arbitration state and completion of outstanding requests.
Figure 9:
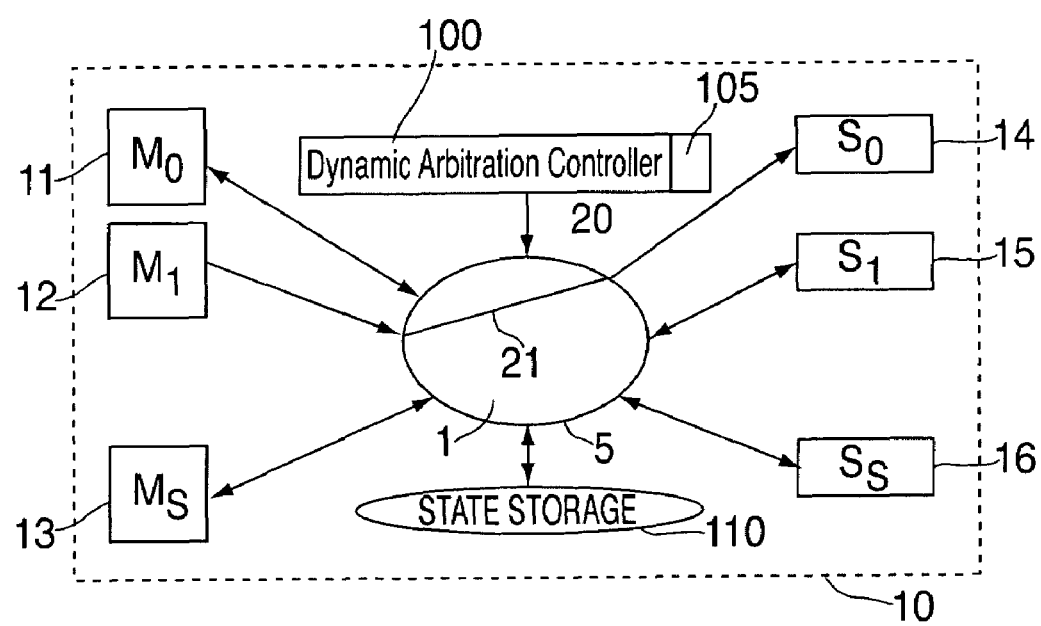
FIG. 9 is a block diagram depicting aspects of assumption of a next request; and, FIG. 10 is a flow chart depicting a process for use of the dynamic arbitration controller.

Referring now to FIGS. 7-9, fulfillment of the outstanding requests is depicted. In FIG. 7, the first request 20 and the second request 21 are blocked from accessing the bus 1 while the third request 22 is granted access to the bus 1 by the arbiter 5. In FIG. 8, the first request 20 is granted tenure on the bus 1 by the arbiter 5. In FIG. 9, the remaining request, the second request 21, is granted tenure on the bus 1 by the arbiter 5.

One skilled in the art will understand that communication within a system-on-a-chip (which contains a plurality of masters and a plurality of slaves communicating via the cross point switch 10) may be greatly facilitated by the dynamic arbitration controller 100. In typical embodiments, the dynamic arbitration controller 100 includes a set of registers for storing the record of known arbitration states 105, where in the record of known arbitration states 105 includes information for identifying aspects of the operation of the system-on-a-chip that may cause a deadlock situation to occur. Typically, the dynamic arbitration controller 100 includes a circuit for saving the current state of the system-on-a-chip upon entering the deadlock condition and for enabling the resumption of the arbitration after resolving of the deadlock condition. Further, in typical embodiments, the dynamic arbitration controller 100 includes a circuit for masking current or pending requests submitted to the cross point switch 10 from an active resource (e.g., master) upon entering the deadlock situation and for granting arbitration to another master.

In some embodiments, the dynamic arbitration controller 100 includes technology for learning aspects of each deadlock situation. In such embodiments, the dynamic arbitration controller 100 may make record of the deadlock situation for subsequent review and analysis.

In some embodiments, the dynamic arbitration controller 100 monitors the current state by evaluating each bus transaction. In other embodiments, the dynamic arbitration controller 100 periodically monitors the current state. These latter embodiments typically require less processing than the former embodiments, and therefore may be advantageous in certain environments.

Figure 10:
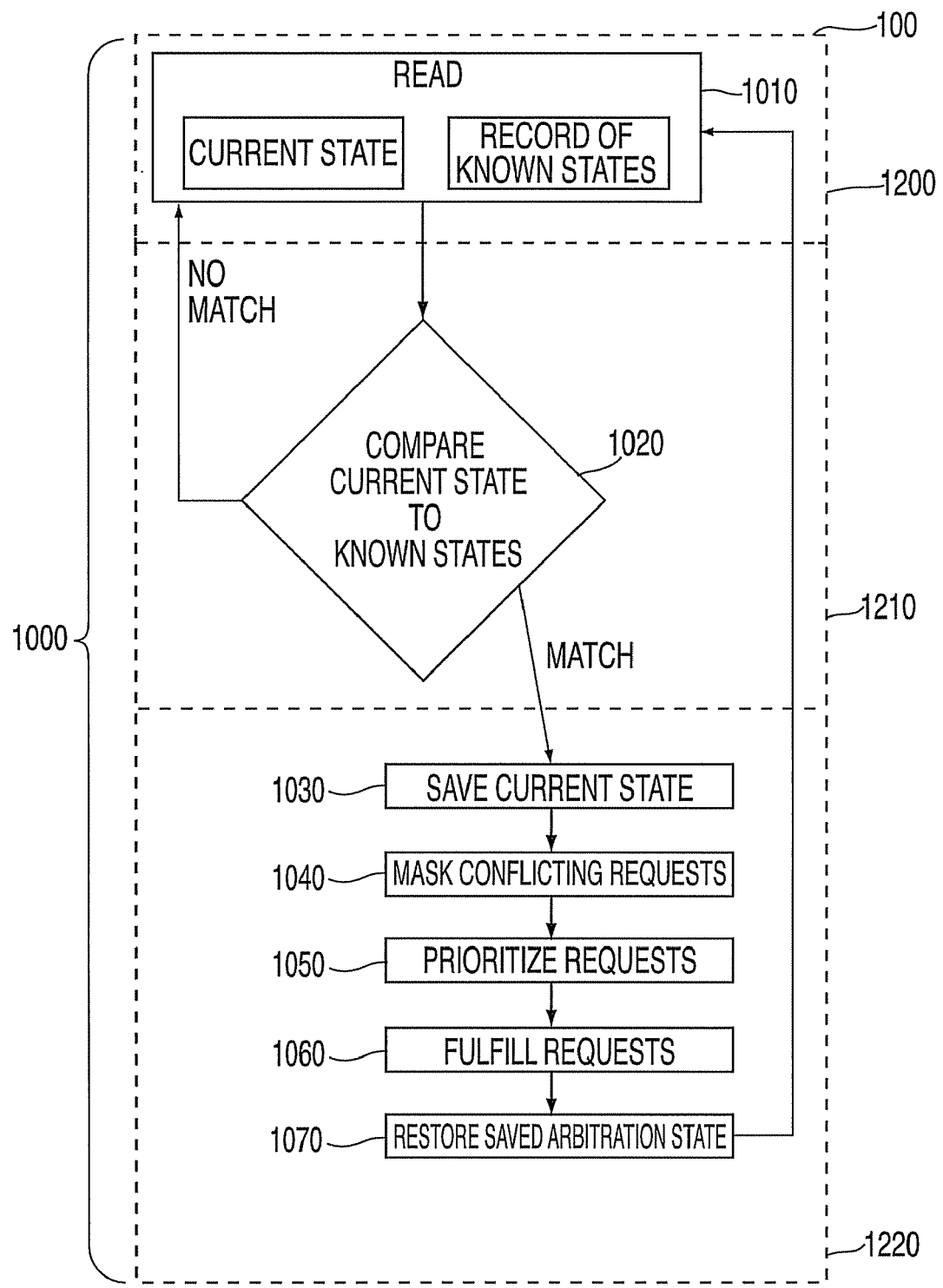

In FIG. 10, an exemplary embodiment of an ongoing process 1000 for operation of the dynamic arbitration controller 100 is depicted. The process 1000 begins by reading 1010 the current state and the record of known arbitration states 105 (in some embodiments, reading 1010 may also be referred to as "monitoring"). Once the current state and the record of known arbitration states 105 has been read, comparing 1020 is conducted. If a match between the current state of the arbiter 5 and a record within the record known arbitration states 105 is found, then the dynamic arbitration controller 100 undertakes various tasks for resolving the deadlock situation. Exemplary steps for resolving include saving of the current state 1030, masking of conflicting requests 1040, prioritizing of the requests 1050, fulfillment of the requests 1060, and restoration of the saved arbitration state 1070. Once restoration of the saved arbitration state 1070 has been completed, the dynamic arbitration controller 100 again commences reading 1010 of the current state and the record of known arbitration states 105. If no match is found during comparing 1020, then the dynamic arbitration controller 100 again commences reading 1010 of the current state and the record of known arbitration states 105. As stated above, reading 1010 may occur on one of a continuous basis, a periodic basis, or on any basis deemed to be appropriate.

Further, and with reference to FIG. 10, one may consider that the dynamic arbitration controller 100 includes a reader 1200 for the reading 1010, a comparator 1210 for the comparing 1210, and a resolver 1220 for resolving the deadlock situation.

Embodiments may be realized in the form of computer-implemented processes and apparatuses for practicing those processes. In exemplary embodiments, the invention is embodied in computer program code. Embodiments include computer program code containing instructions embodied in tangible media, such as a system-on-a-chip. The computer program code may be further embodied on floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An apparatus for resolving a deadlock situation resulting in an interruption of arbitration in a circuit comprising at least one cross point switch as a communications arbiter, the apparatus comprising:

a dynamic arbitration controller for reading at least one record comprising information regarding known arbitration states for causing the deadlock situation, the controller comprising a comparator for comparing contents of a register consisting of a current arbitration state of the at least one cross point switch to the at least one record, the controller further adapted for saving the current arbitration state into a state storage and a resolver for resolving the deadlock situation, temporarily masking each remaining request from an associated master so that an outstanding first request may be addressed until each of the requests have been addressed.

2. The apparatus of claim 1, wherein the dynamic arbitration controller further comprises a reader for reading at least one of the current arbitration state and the at least one record.

3. The apparatus of claim 1, further comprising at least one register for storing the at least one record.

4. The apparatus of claim 1, wherein the information comprises a procedure for resolving the deadlock situation.

5. The apparatus of claim 1, wherein the dynamic arbitration controller comprises a circuit for at least one of saving the current arbitration state and enabling a resumption of the current arbitration state after the resolving.

6. The apparatus of claim 1, wherein the dynamic arbitration controller comprises a circuit for at least one of masking requests to the cross point switch from an active master and for granting arbitration to another master.

7. A method for resolving a deadlock situation resulting in an interruption of arbitration in a circuit comprising at least one cross point switch as a communications arbiter, the method comprising:
reading a current arbitration state of the at least one cross point switch using a dynamic arbitration controller;
reading at least one record comprising information regarding known arbitration states for causing the deadlock situation;
comparing contents of a register consisting of the current arbitration state of the at least one cross point switch to the arbitration state of the at least one record; and,
saving the current arbitration state into a state storage, temporarily masking each remaining request from an associated master so that an outstanding first request may be addressed until each of the requests have been addressed for resolving the deadlock situation.

8. The method of claim 7, wherein resolving comprises following a procedure comprised in the at least one record.

9. The method of claim 7, wherein reading comprises accessing at least one register.

10. The method of claim 7, wherein resolving comprises masking at least one request for arbitration.

11. The method of claim 7, wherein resolving comprises fulfilling at least one request for arbitration.

12. A computer program product stored on machine readable media and for resolving a deadlock situation resulting in an interruption of arbitration in a circuit comprising at least one cross point switch as a communications arbiter, the product comprising instructions for:
reading a current arbitration state of the at least one cross point switch using a dynamic arbitration controller;
reading at least one record comprising information regarding known arbitration states for causing the deadlock situation;
comparing contents of a register consisting of the current arbitration state of the at least one cross point switch to the arbitration state of the at least one record; and,
saving the current arbitration state into a state storage, temporarily masking each remaining request from an associated master so that an outstanding first request may be addressed until each of the requests have been addressed for resolving the deadlock situation.

13. The computer program product of claim 12, wherein resolving comprises following a procedure comprised in the at least one record.

14. The computer program product of claim 12, wherein resolving comprises masking at least one request for arbitration.

15. The computer program product of claim 12, wherein resolving comprises fulfilling at least one request for arbitration.

16. The computer program product of claim 12, wherein resolving comprises restoring a saved arbitration state.

* * * * *